United States Patent
Chien et al.

(10) Patent No.: US 6,397,664 B1
(45) Date of Patent: Jun. 4, 2002

(54) METHOD AND APPARATUS FOR DETECTING LEAKAGE IN A FLOW CONTROL VALVE

(75) Inventors: Hung-Ju Chien; Chin-Chung Lee, both of Hsin-Chu (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/507,017

(22) Filed: Feb. 22, 2000

(51) Int. Cl.[7] .................. G01M 3/00; G01M 3/28; F16K 5/02; F16K 13/04
(52) U.S. Cl. .............. 73/49.8; 73/40.5 R; 73/40; 251/163
(58) Field of Search .............. 73/49.8, 40, 40.5 R; 251/163

(56) References Cited

U.S. PATENT DOCUMENTS

| | | | | |
|---|---|---|---|---|
| 4,132,237 A | * | 1/1979 | Kennedy et al. | 137/75 |
| 4,766,762 A | * | 8/1988 | Tsan | 73/40 |
| 4,869,094 A | * | 9/1989 | Kozuka et al. | 73/2.6 |
| 4,930,748 A | * | 6/1990 | Gonsior | 251/163 |
| 5,142,483 A | * | 8/1992 | Basham et al. | 364/510 |
| 5,195,361 A | * | 3/1993 | Wood et al. | 73/49.8 |
| 5,412,978 A | * | 5/1995 | Boone et al. | 73/49.2 |
| 5,439,355 A | * | 8/1995 | Jimison et al. | 417/63 |
| 5,801,298 A | * | 9/1998 | Anderson | 73/49.8 |
| 6,055,851 A | * | 5/2000 | Tanaka et al. | 73/46 |
| 6,148,854 A | * | 11/2000 | Major et al. | 137/557 |

* cited by examiner

Primary Examiner—Hezron Williams
Assistant Examiner—David J. Wiggins
(74) Attorney, Agent, or Firm—Tung & Associates

(57) ABSTRACT

A method for detecting leakage in a bellow-type flow control valve and an apparatus for use in such detection are described. In the method, a leakage detection device can be connected in line and in fluid communication between a shut-off valve and a bellow-type flow control valve. The leakage detection device includes a mass flow controller and a recording means for detecting any possible leakage of a facility gas that is used to open or close the bellow-type flow control valve into a process gas conduit through a defective bellow. The apparatus may be advantageously equipped with quick disconnect fittings such that it can be used for checking a large number of bellow-type flow control valves that are normally used on a semiconductor fabrication apparatus.

20 Claims, 2 Drawing Sheets

METHOD AND APPARATUS FOR DETECTING LEAKAGE IN A FLOW CONTROL VALVE

FIELD OF THE INVENTION

The present invention generally relates to a method and an apparatus for detecting leakage in a flow control valve and more particularly, relates to a method and an apparatus for detachably mounting a leakage detection device to a bellow-type flow control valve for detecting leakage of a facility gas into a high purity process gas that is controlled by the flow control valve.

BACKGROUND OF THE INVENTION

In the semiconductor process industry, a large variety of different ultra pure gases are used in the fabrication plants. These gases include bulk gases such as $N_2$, $O_2$, $H_2$ and Ar which are normally used in very large quantities, and specialty gases such as He, $A_5H_3$, $PH_3$, $SiH_4$, $NH_3$ and $NF_3$ which are used only in small quantities. In general, the bulk gases are used for purging of chambers, oxidation and cleaning of wafers, while the specialty gases are used as reactant or etching gases.

The bulk gases are normally stored in large storage facilities, for instance, $N_2$ can be supplied from a liquified-nitrogen storage tank located in the gas yard or delivered from a pipeline from a remote air-separation plant; $O_2$ and Ar can be supplied from liquified gas storage tanks; while $H_2$ can be delivered from either a liquified-gas storage tank or a bank of high-pressure gas cylinders. The bulk gases are normally passed through purifiers and gas filters for removing impurities and contaminating particles before allowed to enter a gas-distribution piping system installed inside a cleanroom. On the other hand, the speciality gases are normally stored in small quantities in gas cylinders and are sent directly to the process tools from cylinders stored inside gas cabinets in the cleanroom. The gas cabinets are exhausted safety enclosures that contain the gas cylinders and the necessary gas handling equipment. The gas cabinets serves a major function of allowing purging and safe exchange of the speciality gas cylinders. The gas handling equipment, which includes gas panels incorporating all components for the control and monitoring of high purity gases. In most semiconductor fabrication facilities, the gas cabinet contains at least two process cylinders to allow easy switch-over when one cylinder is empty. In addition, another cylinder of inert gas such as nitrogen is provided for purging the piping line.

In most fabrication processes, the supply pressure for the bulk and the speciality gases is kept at under 10 $Kg/cm^2$. A few exceptions exist such as chlorine and dichlorosilane. At each point of use, the pressure of the bulk or speciality gas has to be independently and locally controlled by a series of flow control valves, pressure regulators, pressure sensors and particle filters located inside a gas manifold box. The precise pressure required for each bulk or speciality gases to be delivered to a specific process tool is determined by the process requirement. In most semiconductor cleanroom facility, one or more gas manifold boxes are installed nearby to each process tool to facilitate gas distribution and control.

A frequently used tool for gas distribution or control is a bellow-type flow control valve for controlling the flow of high purity process gases. One of such commercially available valves is a Nupro valve. Due to the large number of different process gases used in a single process machine, i.e. in a chemical vapor deposition chamber, a large number of bellow-type flow control valves are required for controlling fluid conduits in which process gases pass through.

An illustration of a typical bellow-type flow control valve 10 and its application in controlling a high purity process gas are shown in FIG. 1. To operate the bellow-type flow control valve 10, a facility gas such as a facility nitrogen is normally required. The facility gas is normally controlled by a shut-off valve 14 for controlling its flow. A suitable shut-off valve may be one that is an electromagnetic valve shown in FIG. 1 of a normal-closed type. When a high pressure facility gas, such as nitrogen, is applied to the normal-closed valve 14, the valve 14 opens to let the facility gas to flow therethrough into a fluid conduit 16. The facility gas then enters the bellow-type flow control valve 10 to compress a bellow to open a flow passageway therein allowing a high purity process gas to pass through conduit 12 for feeding to a process chamber (not shown). When the high purity process gas is no longer needed, the bellow-type flow control valve 10 is closed by closing the shut-off valve 14 and thus stopping the flow of the facility gas.

The bellow-type flow control valves have been widely used in gas flow control in the industry, and particularly, in the semiconductor fabrication industry. Problems occur when bellow-type flow control valves have been used for a length of time which frequently leads to a malfunction of the bellow inside the valve control mechanism. When the problem is serious, proper performance of the flow control valve can be affected to render the valve ineffective. One of the frequently observed problems is the leakage of facility gas into a high purity process gas flow due to a leakage existed in the bellow inside the flow control valve. Since a facility gas such as nitrogen frequently contains various impurities of oxygen, hydrogen, water vapor or other impurities, a severe contamination of the high purity process gas occurs which leads to serious fabrication problems. Since a large number of bellow-type flow control valves are normally utilized on a single process machine, it is an insurmountable task to identify a specific flow control valve that is responsible for a leakage. Conventionally, the only way to find a defective valve is by a trial and error method, i.e. by replacing one valve at a time until the contamination problem is solved. This turns out to be an extremely time and labor consuming task resulting in a significant loss in fabrication yield.

It is therefore an object of the present invention to provide a method for detecting leakage in a flow control valve that does not have the drawbacks or shortcomings of the conventional methods.

It is another object of the present invention to provide a method for detecting leakage in a bellow-type flow control valve by connecting a leakage detection apparatus in-between a shut-off valve and the flow control valve.

It is a further object of the present invention to provide a method for detecting leakage in a bellow-type flow control valve by a leakage detection apparatus which includes a mass flow controller and a recording means for connecting between a shut-off valve and the flow control valve.

It is still another object of the present invention to provide a method for detecting leakage in a bellow-type flow control valve by temporarily connecting a leakage detection apparatus in-between a facility gas source and the flow control valve.

It is another further object of the present invention to provide a method for detecting leakage in a bellow-type flow control valve wherein a leakage detection apparatus is connected in-between a shut-off valve and the flow control valve by quick disconnect means.

It is yet another object of the present invention to provide a leakage detection apparatus which includes a mass flow controller and a recording means for detecting leakage through a bellow-type flow control valve.

It is still another further object of the present invention to provide a flow control apparatus that is equipped with a built-in leakage detection device including a shut-off valve, a fluid conduit, a leakage detection device and a bellow-type flow control valve.

It is yet another further object of the present invention to provide a flow control apparatus that is equipped with a built-in leakage detection device which is connected to the flow control apparatus by quick disconnect valves.

SUMMARY OF THE INVENTION

In accordance with the present invention, a method and an apparatus for detecting leakage in a flow control valve are provided.

In a preferred embodiment, a method for detecting leakage in a flow control valve can be carried out by the steps of connecting a shut-off valve between a facility gas source and a first end of a fluid conduit, connecting a second end of the fluid conduit to a facility gas inlet on the flow control valve, providing a leakage detection apparatus in the fluid conduit in fluid communication with the first end and the second end of the conduit, the leakage detection apparatus consists of a mass flow controller for detecting a fluid flow through the conduit and a recording means for recording the fluid flow through the conduit, flowing a facility gas flow into the flow control valve for opening the flow control valve to allow a process gas to pass therethrough, shutting-off the facility gas flow by the shut-off valve to stop the process gas from passing therethrough, and detecting any residual facility gas flow through the flow control valve into the process gas by the leakage detection apparatus.

The method for detecting leakage in a flow control valve may further include the step of opening the flow control valve by compressing on a bellow situated in the valve by the facility gas. The method may further include the step of connecting the leakage detection apparatus into the fluid conduit by a quick disconnect device. The method may further include the step of providing the flow control valve in a Nupro valve. The method may further include the step of providing the facility gas source in a general nitrogen gas source. The method may further include the step of providing the flow control valve in a bellow-type flow control valve for controlling the flow of a high purity process gas. The method may further include the step of providing the shut-off valve in a normal-closed valve. The method may further include the step of recording a gas pressure of the facility gas flown through the mass flow controller by the recording means, the step of recording a gas flow rate of the facility gas flown through the mass flow controller by the recording means, and the step of recording a gas pressure of the facility gas flown through the mass flow controller for a time period of about 1 second.

The present invention is further directed to a flow control apparatus that is equipped with a built-in leakage detection device including a shut-off valve mounted in-between and in fluid communication with a source of facility gas and a first end of a fluid conduit, a fluid conduit for connecting in fluid communication with the shut-off valve at a first end and with a facility gas inlet of a flow control valve at a second end, a flow control valve operated by the facility gas for allowing or disallowing a process gas flow to pass therethrough, and a built-in leakage detection device mounted in the fluid conduit in fluid communication with the first end and the second end of the conduit, the built-in leakage detection device includes a mass flow controller and a recording means for detecting leakage of the facility gas into the process gas flow.

In the flow control apparatus that is equipped with a built-in leakage detection device, the built-in leakage detection device is detachably mounted in the fluid conduit. The flow control valve is used to regulate flow of a process gas that has 99% or higher purity. The flow control valve is a bellow-type valve operated by the shut-off valve. The flow control valve may be a Nupro valve. The leakage of the facility gas into the process gas flow occurs through a defective bellow in the flow control valve. The facility gas may be a general nitrogen gas. The shut-off valve may be a normal-closed on/off valve. The recording means records a pressure of the facility gas that passes through the mass flow controller.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENT

The present invention discloses a method and an apparatus for detecting leakage in a flow control valve, and is particularly suited for detecting leakage in a bellow-type flow control valve frequently used in controlling process gas flow into a semiconductor fabrication apparatus.

The present invention method encompasses a step of connecting a leakage detection device into a fluid conduit between a facility gas source and a bellow-type flow control valve. The connection can be made either permanently, or by quick disconnect fittings in a temporary connecting method. The latter method is more suitable for use in a manufacturing environment since a single leakage detection apparatus can be made portable and be used in detecting leakage on many flow control valves utilized on a single process equipment.

The present invention further discloses a leakage detection apparatus which is constructed by a mass flow controller for detecting a fluid flow through a fluid conduit, and a recording means for recording the fluid flow. Any possible leakage of a facility gas that is used to drive a bellow-type flow control valve through a defective bellow in the valve can be detected by the mass flow controller and recorded by the recording means to alert a machine operator the need for replacement of the flow control valve.

The present invention further discloses a flow control apparatus that is equipped with a built-in leakage detection device which includes a shut-off valve that is a normal-closed electromagnetic valve, a fluid conduit connecting the shut-off valve to a flow control valve, a bellow-type flow control valve to be operated by the facility gas, and a built-in leakage detection device connected in fluid communication between the shut-off valve and the flow control valve to detect any possible leakage of the high pressure facility gas into a process gas flow conduit through a defective bellow situated in the flow control valve. Since the process gas utilized in a semiconductor fabrication process is usually of very high purity, i.e. having a purity of 99% or higher, any contamination by the facility gas can cause serious fabrication problems resulting in a yield loss.

Figure 1:
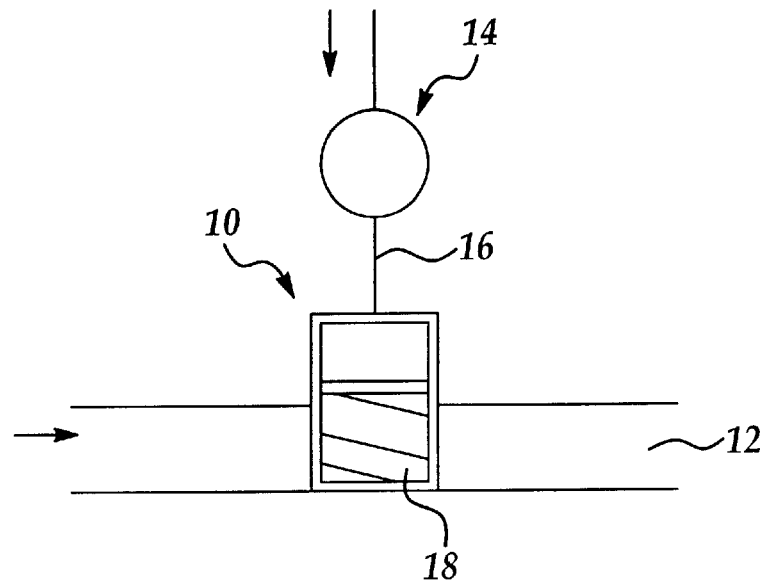
FIG. 1 is an illustration of a conventional bellow-type flow control valve installed in a process gas flow conduit controlled by a shut-off valve.
Figure 2:
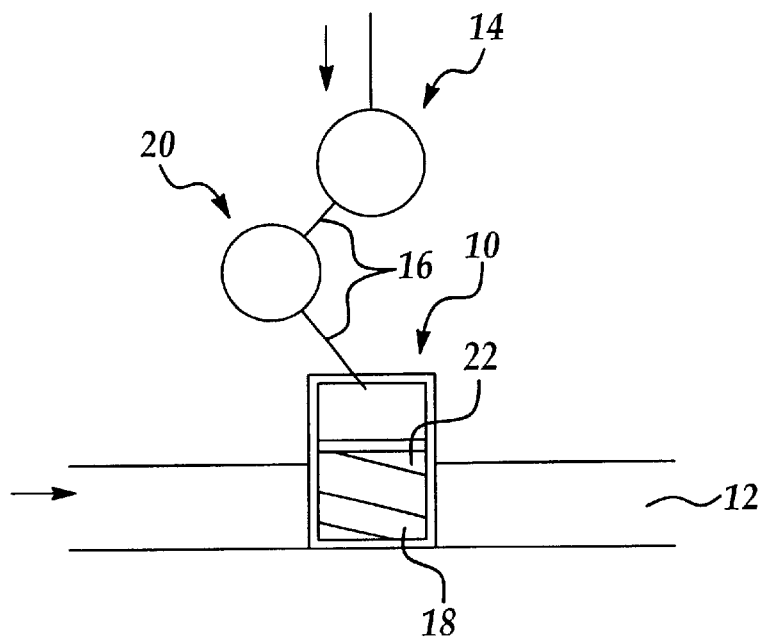
FIG. 2 is an illustration of the present invention flow control apparatus including a bellow-type flow control valve connected in a process gas conduit, controlled by a shut-off valve and monitored by the present invention leakage detection device.
Figure 5:
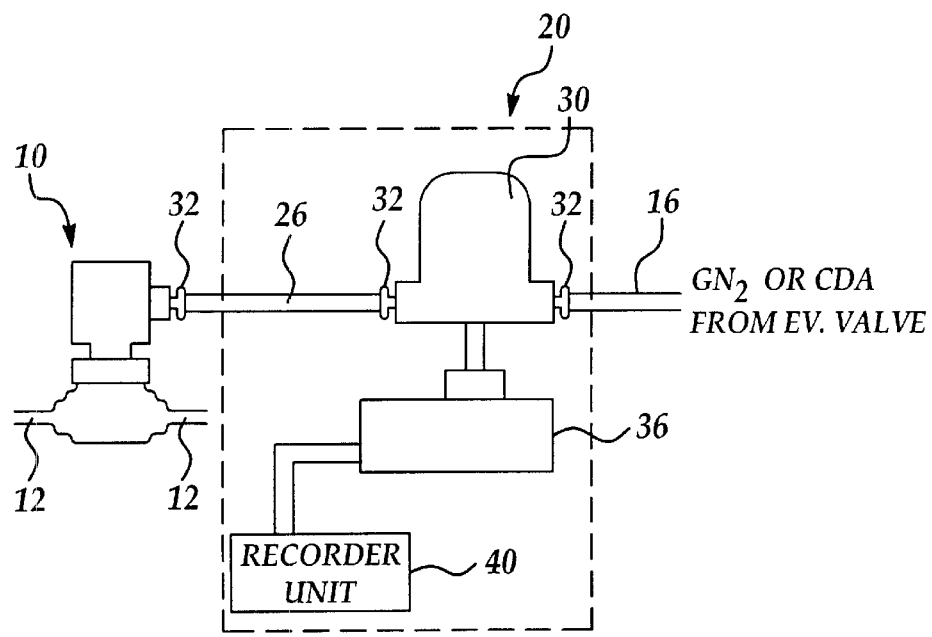
FIG. 5 is a diagram of the present invention leakage detection device connected in series by quick disconnects with a bellow-type flow control valve.

Referring now to FIG. 2, wherein an illustration of the present invention leakage detection device 20 connected in fluid communication and in line between a shut-off valve 14 and a bellow-type flow control valve 10 is shown. The bellow-type flow control valve 10 utilizes a bellow 18 for controlling a flow of a high purity process gas through conduit 12. The leakage detection device 20 is constructed by a mass flow controller 30, a monitor 36 and a recording means 40 which are shown in FIG. 5. The mass flow controller 30 is connected in line, or in series with the fluid conduit 16, 26 for sending a signal to the monitor 36 and the recording means 40 to record either a flow rate of the facility gas or the pressure of the facility gas that has flown through the mass flow controller 30. It should be noted that the present invention leakage detection device 20 is connected to an EV valve (shown as 14 in FIG. 2) by quick disconnects 32 to facilitate the utilization of the device. The mass flow controller 30 may be one of UNIT® 300 sccm for Nz. The feed line, or fluid conduit 16 may be a poly-line made of a polymeric material. The monitor 36 used may be a UNIT®URS series power supply model 10. The recorder 40 used can be advantageously a chart recorder for recording the change in flow rate or pressure of the facility gas of GNz or CDA (clean dry air).

When the bellow-type flow control valve 10 has been used for a prolonged period of time, a leak in the bellow 18 may develop such that the facility gas of nitrogen flows through the bellow defect 22 into the process gas conduit 12 and thus contaminating the high purity process gas. An illustration of the flow rate/time recording made by the recording means is shown in FIG. 3 for a normal Nupro valve, and in FIG. 4 for a defective Nupro valve.

Figure 3:
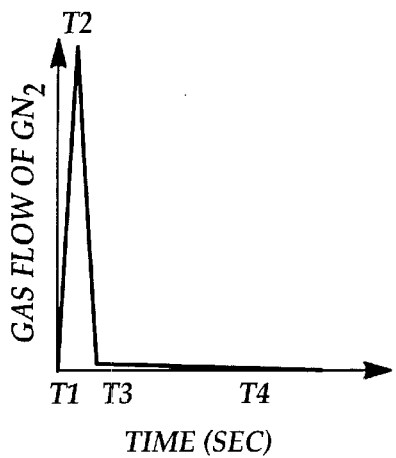
FIG. 3 is a graph plotted of nitrogen gas flow against time for a normal bellow-type to flow control valve.
Figure 4:
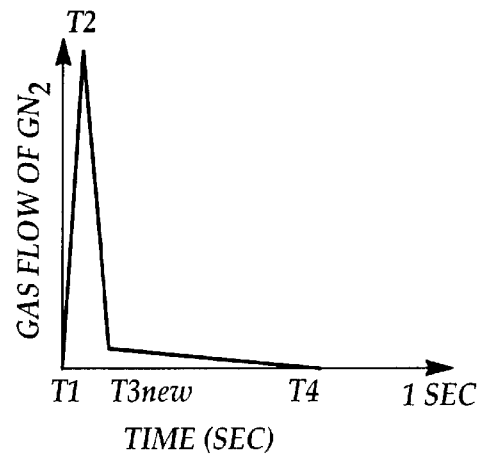
FIG. 4 is a graph plotted of nitrogen gas flow against time for a defective bellow-type flow control valve illustrating a leakage.

It is seen in FIG. 3 that for a normal Nupro or bellow-type flow control valve, when a burst of the facility gas of nitrogen is sent through the leakage detection device 20, i.e. through the mass flow controller and the recorder, a sudden rise in flow rate occurs, i.e. the pressure of the facility gas is increased from 0 at T1 to a maximum at T2. For a normal bellow-type flow control valve, when the shut-off valve 14 is turned off at T2, the flow rate or the pressure of the facility gas drops rapidly to 0 at T3 indicating that there is no leakage through the bellow in the flow control valve. On the contrary, as shown in FIG. 4 for a defective bellow-type flow control valve, when the shut-off valve is turned off at T2, the gas flow or the pressure of the facility gas does not return to 0 at T3. Instead, it takes a fraction of a second for the gas flow or pressure to return to 0 at T4. While the entire process takes less than 1 second, and the time required for the gas flow to become 0 between T3 and T4 is a fraction of a second, a significant amount of the facility gas may have leaked into the process gas conduit 12 through the defective bellow 22. The leakage causes a severe contamination problem in the otherwise high purity process gas. For instance, a high pressure facility gas of nitrogen may contain various amounts of impurities such as oxygen, hydrogen, water vapor and other impurities.

By using the present invention novel apparatus of the leakage detection device, and through a recording such as that shown in FIG. 4, a defective bellow in a bellow-type flow control valve can be easily detected. When the leakage detection device is equipped with quick disconnect fittings, the device can be disconnected from the flow control valve so that the flow control valve can be readily replaced with a new valve. The leakage detection device can then be used in detecting possible leakage in the next bellow-type flow control valve mounted on the same process chamber.

The present invention novel method and apparatus for detecting leakage in a bellow-type flow control valve have therefore been amply described in the above descriptions and in the appended drawings of FIGS. 2–5.

While the present invention has been described in an illustrative manner, it should be understood that the terminology used is intended to be in a nature of words of description rather than of limitation.

Furthermore, while the present invention has been described in terms of a preferred and alternate embodiments, it is to be appreciated that those skilled in the art will readily apply these teachings to other possible variations of the inventions.

The embodiment of the invention in which an exclusive property or privilege is claimed are defined as follows:

We claim:

1. A method for detecting leakage in a flow control valve comprising the steps of:
    connecting a shut-off valve between a facility gas source and a first end of a fluid conduit;
    connecting a second end of said fluid conduit to a facility gas inlet on said flow control valve;
    providing a leakage detection apparatus in said fluid conduit in fluid communication with said first end and said second end of the conduit;
    said leakage detection apparatus comprising:
        a mass flow controller for detecting a fluid flow through said conduit; and
        a recording means for recording said fluid flow through said conduit,
    flowing a facility gas flow from said facility gas source into said flow control valve for opening said flow control valve said facility gas inlet on to allow a process gas to pass therethrough;
    shutting-of said facility gas flow by said shut-off valve to stop said process gas from passing therethrough; and
    detecting any residual facility gas flow through said flow control valve into said process gas by said leakage detection apparatus.

2. A method for detecting leakage in a flow control valve according to claim 1 further comprising the step of opening said flow control valve by compressing on a bellow in said valve by said facility gas.

3. A method for detecting leakage in a flow control valve according to claim 1 further comprising the step of connecting said leakage detection apparatus into said fluid conduit by a quick disconnect device.

4. A method for detecting leakage in a flow control valve according to claim 1 further comprising the step of providing said flow control valve in a Nupro valve.

5. A method for detecting leakage in a flow control valve according to claim 1 further comprising the step of providing said facility gas source in a general nitrogen gas source.

6. A method for detecting leakage in a flow control valve according to claim 1 further comprising the step of providing said flow control valve in a bellow-type flow control valve for controlling the flow of a high purity process gas.

7. A method for detecting leakage in a flow control valve according to claim 1 further comprising the step of providing said shut-off valve in a normal-closed valve.

8. A method for detecting leakage in a flow control valve according to claim 1 further comprising the step of recording a gas pressure of said facility gas flown through said mass flow controller by said recording means.

9. A method for detecting leakage in a flow control valve according to claim 1 further comprising the step of recording a gas flow rate of said facility gas flown through said mass flow controller by said recording means.

10. A method for detecting leakage in a flow control valve according to claim 1 further comprising the step of recording a gas pressure of said facility gas flown through said mass flow controller for a time period of about 1 second.

11. A flow control apparatus equipped with a built-in leakage detection device comprising:
   a shut-off valve mounted in-between and in fluid communication with a source of facility gas and a first end of a fluid conduit;
   a fluid conduit for connecting in fluid communication with said shut-off valve at a first end and with a facility gas inlet of a flow control valve at a second end;
   a flow control valve operated by changing a flow status of said facility gas for allowing or disallowing a process gas flow to pass therethrough; and
   a built-in leakage detection device mounted in said fluid conduit in fluid communication with said first end and said second end of the conduit, said built-in leakage detection device comprises a mass flow controller and a recording means for detecting leakage of said facility gas into said process gas flow.

12. A flow control apparatus equipped with a built-in leakage detection device according to claim 11, wherein said built-in leakage detection device being detachably mounted in said fluid conduit.

13. A flow control apparatus equipped with a built-in leakage detection device according to claim 11, wherein said built-in leakage detection device being detachably mounted in said fluid conduit by quick-disconnect means.

14. A flow control apparatus equipped with a built-in leakage detection device according to claim 11, wherein said flow control valve is used to regulate flow of a process gas having 99% or higher purity.

15. A flow control apparatus equipped with a built-in leakage detection device according to claim 11, wherein said flow control valve is a bellow-type valve operated by said shut-off valve.

16. A flow control apparatus equipped with a built-in leakage detection device according to claim 11, wherein said flow control valve is a Nupro valve.

17. A flow control apparatus equipped with a built-in leakage detection device according to claim 11, wherein said leakage of the facility gas into the process gas flow occurs through a defective bellow in said flow control valve.

18. A flow control apparatus equipped with a built-in leakage detection device according to claim 11, wherein said facility gas is a general nitrogen gas.

19. A flow control apparatus equipped with a built-in leakage detection device according to claim 11, wherein said shut-off valve is a normal-closed on/off valve.

20. A flow control apparatus equipped with a built-in leakage detection device according to claim 11, wherein said recording means records a pressure of said facility gas that passes through said mass flow controller.

* * * * *